United States Patent Office 3,236,980
Patented Feb. 22, 1966

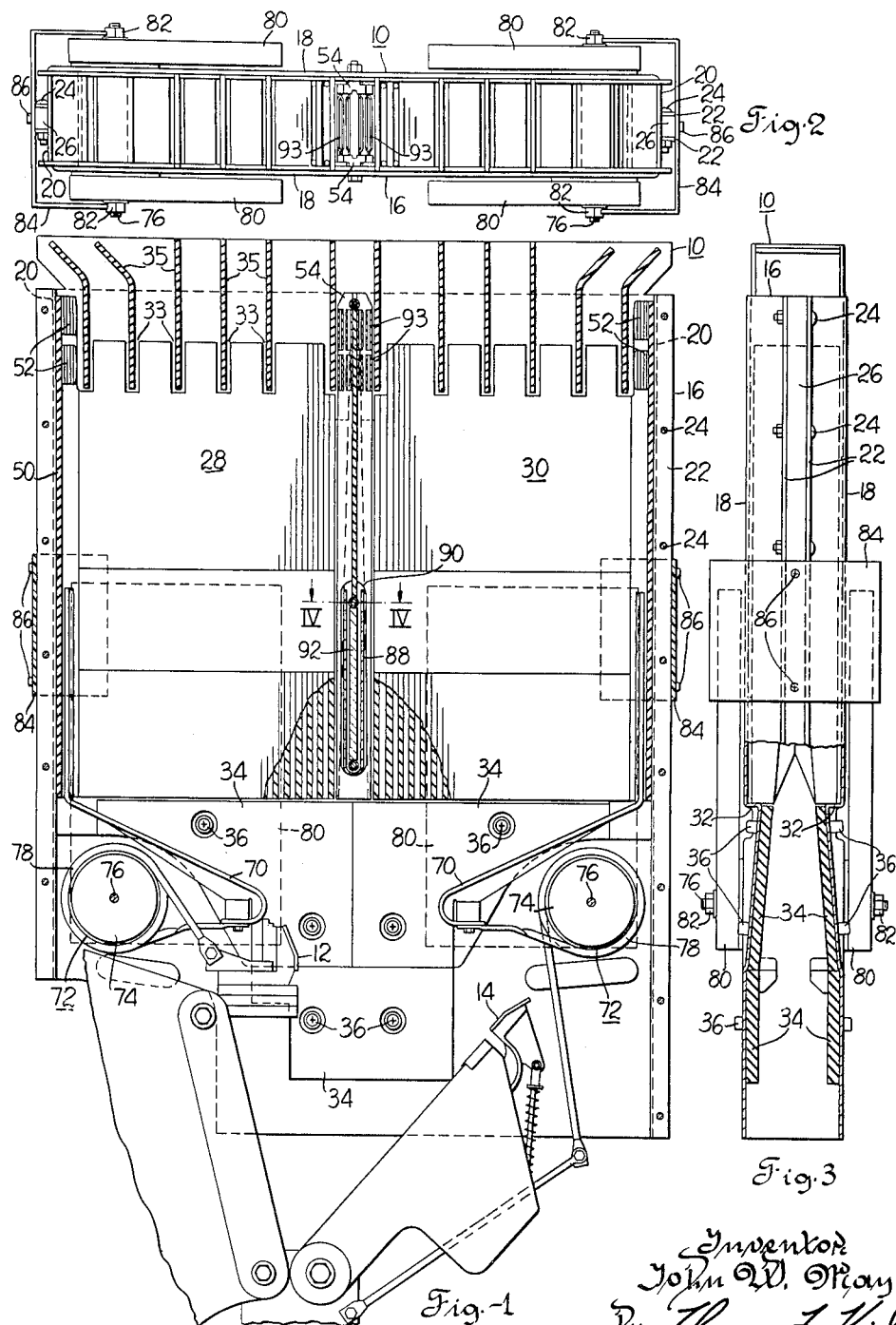

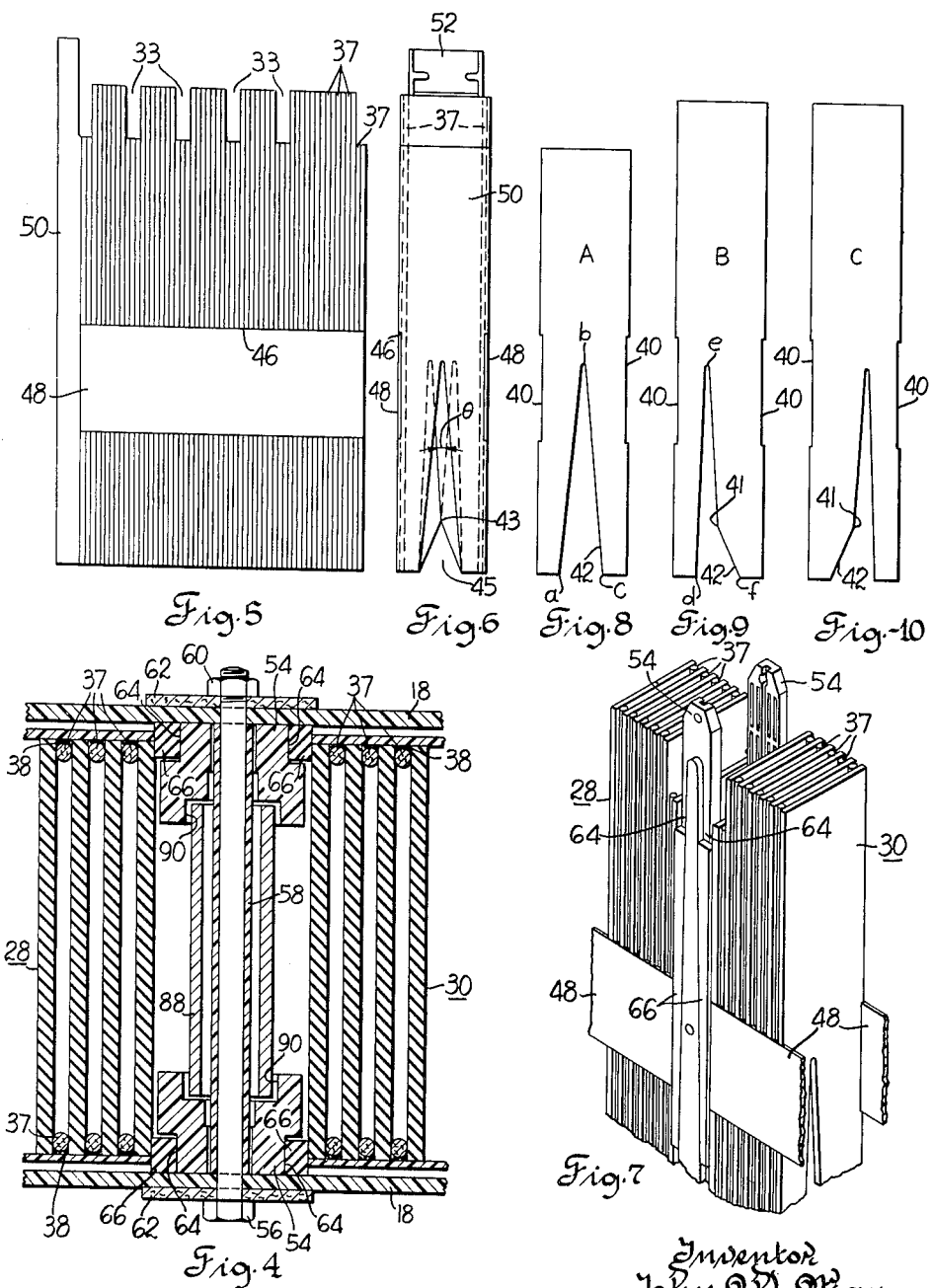

3,236,980
UNITIZED ARC PLATE STACK WITH
REINFORCING MEANS
John W. May, Walpole, Mass., assignor to Allis-Chalmers
Manufacturing Company, Milwaukee, Wis.
Filed Dec. 13, 1963, Ser. No. 330,457
7 Claims. (Cl. 200—144)

This invention relates generally to circuit interrupting devices of the air magnetic type wherein an arc established between separable contacts is transferred along arc runners into an arc extinguishing chute. More particularly, it relates to improvements in the construction of a barrier plate stack employed in such an arc extinguishing chute.

In some circuit interrupting devices of the foregoing type, the arc chute comprises a plurality of spaced apart substantially parallel ceramic barrier plates which are disposed along the path of the arc. The arc chute is adapted to receive the arc at the end adjacent thereto and to exhaust hot gases and other arc products at the other end.

Ceramic barrier plates are relatively fragile and during operation of the circuit breaker, particularly during arcing, are subjected to violent forces which may tend to damage them and then reduce the effectiveness of the arc chute.

It is an object of the present invention to provide an improved arc chute which is constructed so as to minimize the possibility of damage to the ceramic barrier plates.

Another object is to provide an arc chute of the aforesaid character wherein a plurality of ceramic barrier plates employed are preassembled in a strong modular barrier stack which is adapted to be inserted or removed from the arc chute as a unit.

Another object is to provide an improved barrier stack wherein the stack of ceramic barrier plates is strengthened by reinforcing bands along opposite sides of the stack.

Another object is to provide a barrier stack of the aforesaid character wherein each reinforcing band is cemented in recesses provided in the edges of the ceramic plates at the weakest portion of the plates.

Other objects and advantages of the present invention will hereinafter appear.

The accompanying drawings illustrate a preferred embodiment of the invention but it is to be understood that the embodiment illustrated is susceptible of modification with respect to details thereof without departing from the scope of the appended claims.

In the drawings:

FIG. 1 is a side elevation view, with portions broken away, of an arc extinguishing chute of an air magnetic circuit breaker employing the present invention;

FIG. 2 is a top plan view of the arc chute shown in FIG. 1;

FIG. 3 is a side elevational view, with portions broken away, of the arc chute shown in FIG. 1;

FIG. 4 is an enlarged sectional view taken along line IV—IV of FIG. 1;

FIG. 5 is a side elevational view of one of the barrier stacks shown in FIG. 1;

FIG. 6 is an end elevational view of the barrier stack shown in FIG. 5;

FIG. 7 is an isometric view of a portion of the barrier stacks employed in the arc chute shown in FIG. 1;

FIGS. 8, 9 and 10 are plan views of the barrier plates employed in the barrier stack shown in FIGS. 5 and 6.

Figure 11:
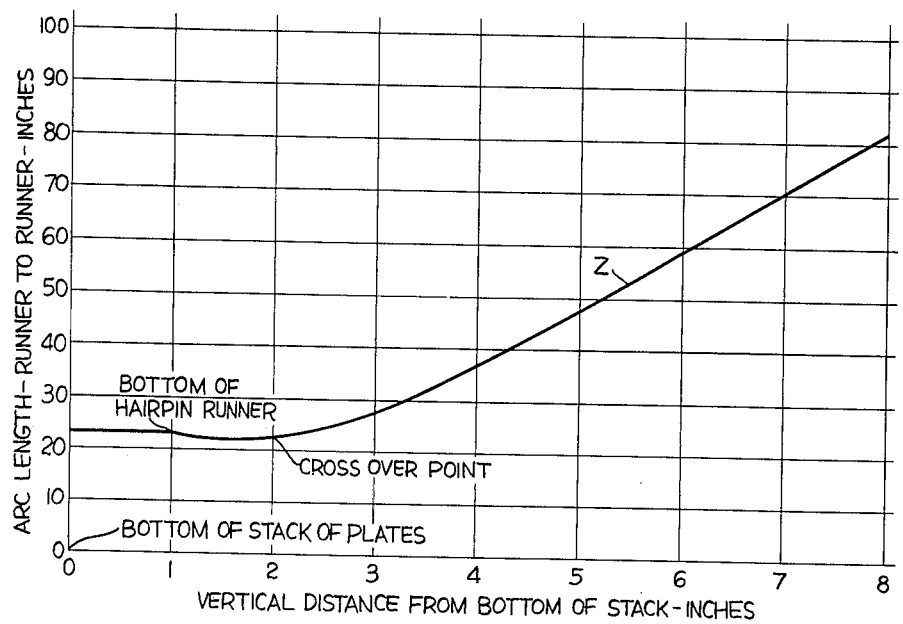
FIG. 11 is a graph showing arc length from the bottom of the stacks to the apex of the slots.

Referring to FIGS. 1, 2 and 3, the numeral 10 designates an arc extinguishing chute incorporating the present invention employed in an air magnetic circuit interrupter. Arc chute 10 is supported on the circuit breaker over a stationary contact assembly 12 and a movable contact assembly 14, shown in FIG. 1, between which an electric arc is initiated during opening of the contacts when they are energized. As will be understood, a circuit interrupter of the type disclosed is normally provided with a plurality of arc chutes and associated sets of contact assemblies, one for each phase of a polyphase electric circuit, but for convenience only one is described herein.

Arc chute 10 comprises an insulating housing 16 having a pair of spaced apart side walls 18 and a pair of spaced apart end walls 20. Housing 16 is formed by a pair of flanged channel members 22 which are secured together at their flanged ends by means such as bolts 24 to define the side walls 18 and the end walls 20. Spacers 26 of insulating material are employed between the flanged ends of the channel members 22 to give the side walls 18 of housing 16 proper spacing. The channels 22 are made of tough electrical insulating material such as polyester glass material.

Housing 16 encloses a pair of modular barrier plate stacks 28 and 30 which are supported end-to-end therein by suitable means such as shoulders 32, shown in FIG. 3, which, preferably, are integrally formed as by molding on the lower inner sides of the channel members 22. However, other supporting means could be employed.

Insulating members 34, shown in FIGS. 1 and 3, are secured by means such as the bolts 36 to the lower inner sides of the channel member 22 to protect the latter against damage from arcing.

As FIG. 4 shows, barrier stack 28, which is similar in all respects to barrier stack 30 except that it is reversed in housing 16, comprises a plurality of spaced apart slotted barrier plates fabricated of insulating material. The barrier plates have the configurations of the plates A, B and C shown in FIGS. 8, 9 and 10, respectively, and each plate is provided with a slot 42 for accommodating an arc, as will hereinafter appear.

Each barrier plate is spaced from an adjacent barrier plate by insulating spacing means such as a pair of asbestos rope spacers 37 which, as FIG. 4 shows, are cemented as at 38 along the side edges of the plates by means of a suitable insulating cement. Such cementing serves to keep the asbestos rope spacers in place and in conjunction with the spacers 37 seals the sides of the arcing space between each pair of plates. In addition, such cementing binds all the plates into a modular barrier stack.

Since it is desirable for electrical reasons that some, if not all, the plates in barrier stack 28 be made of ceramic material such as zircon, which is relatively fragile, it is necessary to provide additional reinforcement to make barrier stack 28 shock resistant. Thus, as FIGS. 8, 9 and 10 show, each plate in barrier stack 28 is provided with a notch or indentation 40 on each of its opposite side edges. The notches 40 in each plate straddle or lie adjacent a region in which the apex of the slot 42 in the plate terminates, which is the weakest portion of a ceramic plate and subject to cracking. Thus, when the plates are arranged in barrier stack 28, the notches 40 on the plates A, B and C along each side of the stack align with each other to provide a recess or groove 46, shown in FIGS. 5 and 6, which is adapted to accommodate a reinforcing member 48 made of insulating material, such as glass bonded mica which is a strong, nonbrittle somewhat resilient material. To add further strength to barrier stack 28, the two outermost end plates A of the stack are also fabricated of glass bonded mica or similar non-brittle insulating material, instead of the relatively fragile ceramic of which the plates B and C are fabricated. Each reinforcing member 48 is cemented in its respective groove 46 by means of a suitable insulating cement which makes contact with the edges of the notches 40 in the plates and with the adjacent portion of the asbestos rope spacers 37.

As FIG. 6 shows, the asbestos rope spacers 37 are set back from the edges of the plates forming barrier stack 28 sufficiently far to afford clearance for the reinforcing members 48 in the notches 40.

It will be noted that each groove 46 is at least as deep as the thickness of its associated reinforcing member 48 so that when the latter is in place in the groove, the sides of barrier stack 28 are flush at least in so far that the reinforcing members do not project beyond. This feature is advantageous in assuring a close fit between the sides of barrier stack 28 and the sides of housing 16.

As FIGS. 1, 2, 3, 5 and 6 show, a chimney 50 having a C-shaped cross section is rigidly secured by means of suitable cement along its edges to one end of barrier stack 28, namely, to barrier plate A. A gas cooler 52 comprised of a plurality of spaced apart metal plates is supported within the upper end of chimney 50, as FIGS. 1 and 6 show.

In a preferred embodiment, barrier stack 28 comprises twenty-nine plates arranged in the following order (proceeding from left to right in FIG. 5):

ABCBCBCBCBCBCBCBCBCBCBCBCBCBA

It is to be understood that plates B and C have the same configuration but are reversely disposed with respect to each other in the barrier stack. As FIGS. 1 and 5 show, the first, sixth, eleventh, sixteenth, twenty-first and twenty-ninth plates are shorter in length at their tops than the remainder of the plates in barrier stack 28 to provide a plurality of notches 33 in the top of the barrier stack for accommodating baffle plates 35 made of insulating material. The plates A, B and C are about three-sixteenths of an inch thick and are spaced about three-sixteenths of an inch apart and barrier stack 28, excluding its chimney 50, is about ten and one-half inches long, three and one-half inches wide and eighteen inches high.

Referring to FIG. 8, slot 42 in plate A is defined by a line commencing from first point (a) on the bottom edge of the plate which is understood to be spaced a predetermined distance from a center line through the plate normal to the bottom edge, thence to an apex point (b) located on the center line about nine times said predetermined distance from the bottom edge of the plate; and thence to a second point (c) on the bottom edge of the plate which is understood to be spaced from the center line the same predetermined distance as point (a).

Referring to FIG. 9, slot 42 in plate B is defined by a line commencing from a first point (d) on the bottom edge of the plate which is understood to be spaced the same predetermined distance referred to above from a center line through the plate normal to the bottom edge; thence to an apex point (e) located slightly less than the said predetermined distance away from the center line and about nine times said predetermined distance from the bottom edge of the plate; thence to a cross over point 41 located on the center line about two and one-fourth times said predetermined distance from the bottom edge of the plate; and thence to a second point (f) on the bottom edge of the plate which is understood to be spaced from the center line the same predetermined distance as point (d).

As will be understood, slot 42 in plate C is defined in a similar manner as the slot in plate B but is reversed with respect to the center line of the plate.

In a barrier stack 28, the straight line distance between apex point (e) of slot 42 of plate B and the apex point of slot 42 of an adjacent plate C is approximately four times the straight line distance between the cross over points 41 of those same plates.

In the preferred embodiment referred to above, the slots 42 in plates A, B, and C are about one and three-quarters inches wide at the bottom, i.e., about seven-eighths of an inch of the opening being disposed on the bottom side of a center line on the plates. The apex of slot 42 in plate A is on the center line thereof about eight inches from the bottom of the plate. The apex of slot 42 in plate B is about eleven-sixteenths of an inch to the left of the center line of the plate and about eight inches from the bottom of the plate, while the point 41 is located on the center line of the plate about two inches directly above the bottom. The dimensions of the slot in plate C are the same as those of the slot in plate B but reversely disposed, as comparison of FIGS. 9 and 10 shows.

The slots 42 in plates A, B and C align in barrier stack 28 as shown in FIG. 6 and the cross over points 43 of plates B and C are located on a line lying in the central plane of the barrier stack, which line is about two inches above the bottom of the barrier stack. The angle at which the plates B and C cross over above cross over point 43 is designated as theta ($\theta$) in FIG. 6 and is approximately 12° (twelve degrees) and is a critical angle in that it controls the rate at which the arc is elongated as it moves up into the barrier stack.

As FIG. 6 shows, widening of the slots 42 in the plates B and C in the region between their cross over points 41 (see FIGS. 9 and 10) and the bottom edge of the plates provides a widened space 45 which permits an arc to get well within barrier stack 28 before it becomes elongated by the tortuous path it must follow as it moves upward. In actual tests an arc drawn by an alternating current of 32,000 amperes at 15,000 volts, three phase, entering barrier stacks 28 and 30 was elongated about four times its initial length of twenty-two inches below cross over 43 (see FIG. 11), by the time it reached the apex of the slots and was extinguished.

The ratio of increase in arc length to distance of the arc from the bottom of barrier stack 28 is controlled by angle theta and in a barrier stack having the configuration and dimensions described above produced the curve Z on the graph shown in FIG. 11. If angle theta ($\theta$) is substantially greater than 12°, the arc is elongated too rapidly with respect to its movement up into the barrier stack and with respect to its increase in arc voltage and tends to hang at or slightly above the cross over 43. If, on the contrary, angle theta ($\theta$) is substantially less than 12°, the arc is not elongated rapidly enough with respect to its movement up into the barrier stack and with respect to its increase in arc voltage and tends to hang at the apex of the slots, continuing to restrike. It will be noted that the slope of curve Z in FIG. 11 increases very gradually from the cross over point and reaches a maximum length of eighty-two inches at the top of the slots, with a maximum rate of increase (11.5 inches in arc length per inch rise) occurring at the top. As a result of this gradual increase in arc length, the arc moves rapidly upward over cool ceramic surfaces, always generating an increasing arc voltage until a value is reached at an early current zero for complete interruption.

In addition to the shoulders 32 which support barrier stacks 28 and 30, means are provided to rigidly secure the barrier stacks within housing 16 of arc chute 10 against upward or endwise movement or other relative movement. Such means comprise a pair of supporting members or projecting means 54, shown in FIGS. 1, 2, 4 and 7, which are rigidly mounted within housing 16 between the opposed ends of the barrier stacks 28 and 30. If preferred, the supporting members 54 could be integrally formed with housing 16 or by being fabricated as portions of the channels 22. The supporting members 54, which are fabricated of electrical insulating material, are rigidly secured against the inner surface of a respective channel 22 forming housing 16 by a plurality of bolts 56. Each bolt 56 extends through holes in both channels 22 and in both supporting members 54 and each bolt has an insulating tube 58 disposed thereon between the two side walls 18 of housing 16. Thus the bolts 56 and nuts 60 force the side walls 18 of arc chute 10 tightly against tube 58 and prevent outward bowing caused by the blast of gases during arcing. Suitable washers 62 are provided between the head of each bolt 56 and one side wall 18 and between each nut 60 and the other side wall 18 of arc chute 10.

Each supporting member 54 is provided, as FIGS. 1, 4 and 7 show, with a pair of downwardly tapered grooves 64, each of which is adapted to receive a tapered wedge 66, formed of insulating material such as phenolic. Thus, when the barrier stacks 28 and 30 are in place within housing 16, driving of each wedge 66 into the space formed by one of the grooves 64 and the adjacent end of the associated barrier stack causes that barrier stack to be forced tightly against one of the end walls 20. More specifically, chimney 50 on the end of the barrier stack is forced tightly up against the inner side of the end wall 20. In this manner, each arc chute is wedged against movement with housing 16. Upon removal of the wedges 66 associated with each barrier stack, the stack can be removed for inspection, repair or replacement.

Arc chute 10 is provided with means to move and guide an arc formed between stationary contact assembly 12 and movable contact assembly 14 into the barrier stacks 28 and 30. Thus, a pair of arc runners 70 are mounted within housing 16, one at each opposite end thereof. Each arc runner 70 has a portion extending into the chimney 50 of its associated barrier stack. The arc runners 70 are made of electrically conductive nonmagnetizable material such as copper.

A pair of magnetic blowout assemblies 72 are mounted on arc chute 10, one at each end thereof. Each magnetic blowout assembly 72 comprises a magnetizable core 74 mounted within housing 16 and extending through the channels 22 of housing 16. A coil 78 is wound on each core 74 in a righthand direction (with respect to FIG. 1) and has one end connected to one of the associated arc runners 70 and has its other end connected to one of the circuit breaker contact assemblies 12 or 14, as the case may be. A pair of pole pieces 80 are provided in each blowout assembly 72 and are mounted on each end of core 74 by means of stud 76 and held tightly against the core 74 by nuts 82, shown in FIG. 3. A pair of U-shaped members 84 of insulating material are provided, one at each end of housing 16. Each member 84 is disposed around an end of housing 16 and is attached thereto by the bolts 86. Each member 84 overlies portions of one pair of pole pieces 80 and serves to stabilize the upper ends of pole pieces 80 against the arc chute 10.

In addition to the pair of arc runners 70, FIGS. 1 and 4 show that a hairpin type arc runner 88 is mounted in housing 16 between the barrier stacks 28 and 30 in a recess 90 formed in the supporting member 54. A magnetizable core 92 is mounted between the extremities of hairpin runner 88 in recess 90.

As FIGS. 1 and 2 show, a gas cooler 93 comprised of a plurality of spaced apart metal plates is supported between the supporting members 54 at their upper ends.

The apparatus hereinbefore described operates as follows.

Assume that movable contact assembly 14 of the circuit breaker has opened and that an electric arc, initially formed between the contacts of the movable and stationary contact assemblies 12 and 14, respectively, has moved upwardly so as to be established between the lower portions of the pair of arc runners 70. With the arc in this position, current flows through the pair of coils 78 thereby causing a magnetic field to be established between the pair of pole plates 80 in each magnetic blowout assembly 72. The effect of the magnetic fields so established is to move the arc upward along the arc runner 70 and into the lower portion of the barrier stacks 28 and 30, whereupon the center of the arc attaches to hairpin arc runner 88.

The configuration of the slots 42 in the end plates A in the barrier stacks 28 and 30 permit the arc easy access to the chute. Similarly, the widened spaces 45 at the bottom of the barrier stacks 28 and 30 assist in this regard. Upon this occurrence, two separate but electrically connected arcs are established, each such arc proceeding upwardly in its respective barrier stack 28 or 30. Current flow through the bend of hairpin arc runner 88 causes core 92 to establish a magnetic field which also assists in moving the two arcs upward into the barrier stacks 28 and 30. As each arc moves upward in its respective barrier stack, it is elongated to approximately four times its initial length of eleven inches below cross over 43 (see FIG. 11), by the time it reaches the apex of the slots in the barrier plates forming the barrier stack. Because, as hereinbefore explained, the rate of rise of arc in the barrier stack has a preferred relationship to the rate of its elongation and to arc voltage, the arc extinguishes when it reaches the apex of the slots. Arc by-products such as gases and any material particles continue to be exhausted upward through the spaces between the barrier plates and through the chimneys 50 and are cooled thereby and by the coolers 52, 93 and 35 before being exhausted to the atmosphere.

The embodiments of the invention in which an exclusive property or privilege is claimed are defined as follows:

1. In a barrier plate stack for an arc extinguishing chute, in combination, a plurality of spaced apart barrier plates forming said stack, each of said plates having a notch on each of the two opposite edges thereof to provide a recess on each of the two opposite sides of said stack, and a pair of insulating reinforcing members cemented in said recesses, one member being provided for each recess.

2. In a barrier plate stack for an arc extinguishing chute, in combination, a plurality of spaced apart barrier plates forming said stack, each of said plates having an arc accommodating slot extending inwardly from one edge of the plate, each of said plates also having a notch on each of two other opposite edges of the plate to provide a recess on each of the two opposite sides of said stack, the notches in each plate straddling a region wherein the apex of said slot lies, and a pair of insulating reinforcing members cemented in said recesses, one member being provided for each recess.

3. The combination according to claim 2 wherein the thickness of each of said reinforcing members is substantially the same as the depth of the recess wherein it is disposed so that the sides of said barrier stack are flush.

4. In a barrier plate stack for an arc extinguishing chute, in combination, a plurality of spaced apart barrier plates forming said stack, each of said plates having a notch on each of the two opposite edges thereof to provide a recess on each of the two opposite sides of said stack, insulating spacers cemented between each pair of barrier plates adjacent the said opposite edges of the plates, and a pair of insulating reinforcing members cemented in said recesses, one member being provided for each recess.

5. In a barrier plate stack for an arc extinguishing chute, in combination, a plurality of spaced apart barrier plates forming said stack, each of said plates having an arc accommodating slot extending inwardly from one edge of the plate, each of said plates also having a notch on each of two other opposite edges of the plate to provide a recess on each of the two opposite sides of said stack, the notches in each plate straddling a region wherein the apex of said slot lies, insulating spacers cemented between each pair of barrier plates adjacent the said opposite edges of the plates, and a pair of insulating reinforcing members cemented in said recesses, one member being provided for each recess.

6. The combination according to claim 5 wherein the thickness of each of said reinforcing members is substantially the same as the depth of the recess wherein it is disposed so that the sides of said barrier stack are flush.

7. The combination according to claim 6 wherein the two outermost end plates of said stack and said reinforcing member are formed of a nonbrittle insulating material and wherein at least some of the plates disposed intermediately of said two outermost end plates are formed of ceramic insulating material.

References Cited by the Examiner
UNITED STATES PATENTS
2,575,730  11/1951  Sandin et al. _____ 200—144

KATHLEEN H. CLAFFY, *Primary Examiner.*